(12) United States Patent
Miyaki (10) Patent No.: US 7,889,916 B2
(45) Date of Patent: Feb. 15, 2011

(54) IMAGE PROCESSOR

(75) Inventor: Kazuyuki Miyaki, Nagoya (JP)

(73) Assignee: Brother Kogyo Kabushiki Kaisha, Tokyo (JP)

( * ) Notice: Subject to any disclaimer, the term of this patent is extended or adjusted under 35 U.S.C. 154(b) by 881 days.

(21) Appl. No.: 11/823,597

(22) Filed: Jun. 28, 2007

(65) Prior Publication Data

US 2008/0002881 A1 Jan. 3, 2008

(30) Foreign Application Priority Data

Jun. 30, 2006 (JP) .............................. 2006-181782

(51) Int. Cl.
*G06K 9/00* (2006.01)
*H04N 1/46* (2006.01)

(52) U.S. Cl. ....................... 382/162; 382/254; 358/500; 358/512; 358/515; 358/530

(58) Field of Classification Search ......... 382/162–172, 382/254–275; 358/500–501, 512, 515–522, 358/530–540
See application file for complete search history.

(56) References Cited

U.S. PATENT DOCUMENTS

| | | | | |
|---|---|---|---|---|
| 4,319,267 A | * | 3/1982 | Mitsuya et al. ............. | 358/539 |
| 4,908,698 A | * | 3/1990 | Enomoto et al. ......... | 348/396.1 |
| 5,363,209 A | * | 11/1994 | Eschbach et al. ............ | 358/445 |
| 6,462,768 B1 | | 10/2002 | Oakley | |
| 6,813,040 B1 | * | 11/2004 | Uchino et al. ................. | 358/1.9 |
| 6,829,383 B1 | * | 12/2004 | Berestov ...................... | 382/154 |
| 7,030,913 B2 | * | 4/2006 | Ikeda ....................... | 348/223.1 |
| 7,394,930 B2 | * | 7/2008 | Trimeche et al. ............. | 382/167 |
| 7,409,060 B2 | * | 8/2008 | Nomizu et al. ............. | 380/200 |
| 7,616,811 B2 | * | 11/2009 | Kalevo et al. ............... | 382/167 |
| 2001/0014175 A1 | * | 8/2001 | Tavor .......................... | 382/167 |
| 2002/0080432 A1 | * | 6/2002 | Kawahara et al. ........... | 358/515 |
| 2004/0146160 A1 | * | 7/2004 | Nomizu et al. .............. | 380/200 |
| 2005/0140999 A1 | * | 6/2005 | Morii et al. .................. | 358/1.9 |
| 2005/0213125 A1 | * | 9/2005 | Smith et al. .................. | 358/1.9 |
| 2006/0192938 A1 | | 8/2006 | Kawahito | |
| 2006/0269125 A1 | * | 11/2006 | Kalevo et al. ............... | 382/162 |
| 2010/0150469 A1 | * | 6/2010 | Perlmutter et al. .......... | 382/266 |

FOREIGN PATENT DOCUMENTS

JP   11-509657   8/1999

(Continued)

*Primary Examiner*—Manav Seth
(74) *Attorney, Agent, or Firm*—Scully, Scott, Murphy & Presser, P.C.

(57) ABSTRACT

An image processing device includes: a component separating unit; a distribution modifying unit; and a component combining unit. The component separating unit separates an image, which is represented by image data obtained by imaging a scene, into component images for a plurality of color components. The distribution modifying unit sets one of the component images for a predetermined color component as a reference component image, sets at least one component image other than the reference component image as at least one non-reference component image, and modifies distribution of pixels for brightness levels in each non-reference component image based on distribution of pixels for brightness levels in the reference component image. The component combining unit combines together the reference component image and the at least one non-reference component image modified by the distribution modifying unit.

11 Claims, 7 Drawing Sheets
(3 of 7 Drawing Sheet(s) Filed in Color)

FOREIGN PATENT DOCUMENTS

| | | |
|---|---|---|
| JP | 2002-232906 | 8/2002 |
| JP | 2003-209727 | 7/2003 |
| JP | 2004-294420 | 10/2004 |
| JP | 2005-87468 | 4/2005 |
| WO | WO 9704417 | 2/1997 |

* cited by examiner

IMAGE PROCESSOR

CROSS REFERENCE TO RELATED APPLICATION

This application claims priority from Japanese Patent Application No. 2006-181782 filed Jun. 30, 2006. The entire content of this priority application is incorporated herein by reference.

TECHNICAL FIELD

The present invention relates to an image processor for processing images based on image data.

BACKGROUND

When using a camera to photograph a scene including elements far in the distance (hereinafter, also referred to as a "distant scene"), light reflected off the distant elements is scattered due to the effects of moisture and dust contained in the atmosphere, for example, as the light propagates through the air. Hence, the intensity of light reaching the camera is lower, diminishing the contrast in the image taken by the camera.

U.S. Pat. No. 6,462,768B1 offers one example for resolving this problem by adjusting the brightness in each region of an image based on the distance to the subject.

SUMMARY

However, light propagating through the atmosphere is configured of a plurality of color components, each of which exhibits a different degree of scattering in the atmosphere. Hence, by simply adjusting the brightness in each image region, as described in the above method, color components exhibiting a relatively high degree of scattering will drop in contrast relative to color components exhibiting a small degree of scattering, while color components having a relatively small degree of scattering will increase in contrast relative to other color components.

Therefore, this technology may not be able to reproduce color components in the image accurately, making the resulting image visually unappealing.

In view of the foregoing, it is an object of the present invention to provide a technology for improving reproducibility of color components in an image when increasing the contrast of an image obtained by imaging a distant scene, so that the resulting image is not visually unappealing.

In order to attain the above and other objects, the invention provides an image processing device including: a component separating unit; a distribution modifying unit; and a component combining unit. The component separating unit separates an image, which is represented by image data obtained by imaging a scene, into component images for a plurality of color components. The distribution modifying unit sets one of the component images for a predetermined color component as a reference component image, sets at least one component image other than the reference component image as at least one non-reference component image, and modifies distribution of pixels for brightness levels in each non-reference component image based on distribution of pixels for brightness levels in the reference component image. The component combining unit combines together the reference component image and the at least one non-reference component image modified by the distribution modifying unit.

According to another aspect, the invention provides an image processing method, including: separating an image, which is represented by image data obtained by imaging a scene, into component images for a plurality of color components; setting one of the component images for a predetermined color component as a reference component image, setting at least one component image other than the reference component image as at least one non-reference component image, and modifying distribution of pixels for brightness levels in each non-reference component image based on distribution of pixels for brightness levels in the reference component image; and combining together the reference component image and the modified at least one non-reference component image.

According to another aspect, the invention provides a storage medium storing a set of image processing program instructions executable on a data processing device, the set of image processing program instructions including: separating an image, which is represented by image data obtained by imaging a scene, into component images for a plurality of color components; setting one of the component images for a predetermined color component as a reference component image, setting at least one component image other than the reference component image as at least one non-reference component image, and modifying distribution of pixels for brightness levels in each non-reference component image based on distribution of pixels for brightness levels in the reference component image; and combining together the reference component image and the modified at least one non-reference component image.

BRIEF DESCRIPTION OF THE DRAWINGS

The patent or application file contains FIGS. 4, 6, 7A and 7B executed in color. Copies of this patent or patent application publication with color drawings will be provided by the Office upon request and payment of the necessary fee.

The particular features and advantages of the invention as well as other objects will become apparent from the following description taken in connection with the accompanying drawings, in which.

DETAILED DESCRIPTION

An image processor according to an embodiment of the invention will be described while referring to the accompanying drawings wherein like parts and components are designated by the same reference numerals to avoid duplicating description.

Next, an embodiment of the present invention will be described while referring to the accompanying drawings.

Figure 1:
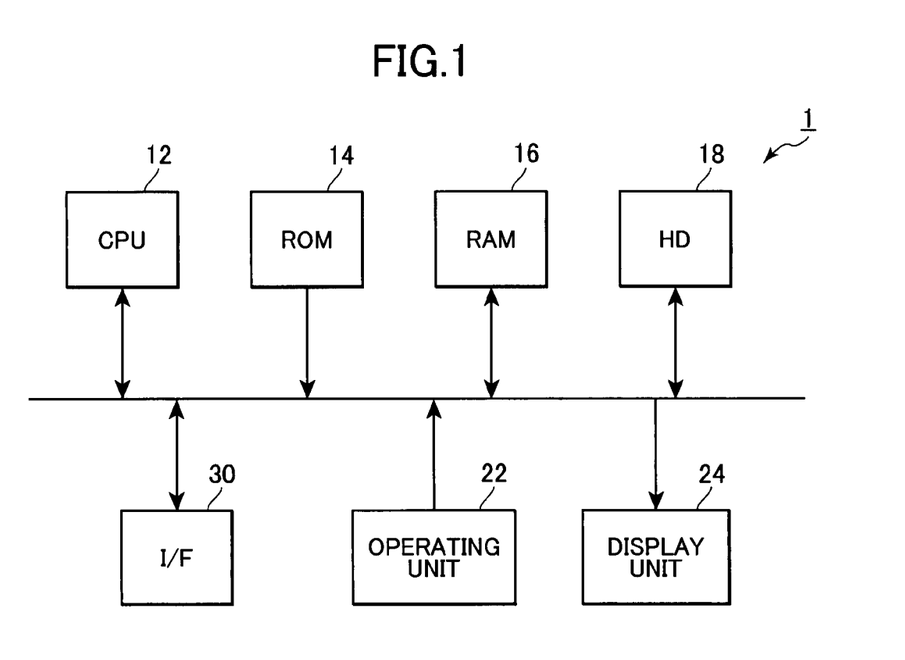
FIG. 1 is a block diagram showing the structure of an image processor according to an embodiment of the present invention.

An image processor 1 is configured of a personal computer and includes a CPU 12, a ROM 14, a RAM 16, a hard disk drive (HDD) 18, an operating unit 22, a display unit 24, and various interfaces 30.

The CPU 12 is configured to control the overall operations of the image processor 1 according to programs stored in the HDD 18.

The various interfaces 30 include a DSC (digital still camera) interface for handling data input and output with a digital still camera, a PC interface for handling data input and output with another personal computer, and an external memory interface for handling data input and output with a removable external memory.

Next, steps in an image modification process executed by the CPU 12 will be described with reference to FIG. 2. The image modification process begins when the user performs a prescribed operation on the operating unit 22. The image modification process is mainly for processing image data representing a distant scene imaged by a camera or other image pick-up device.

Figure 4:
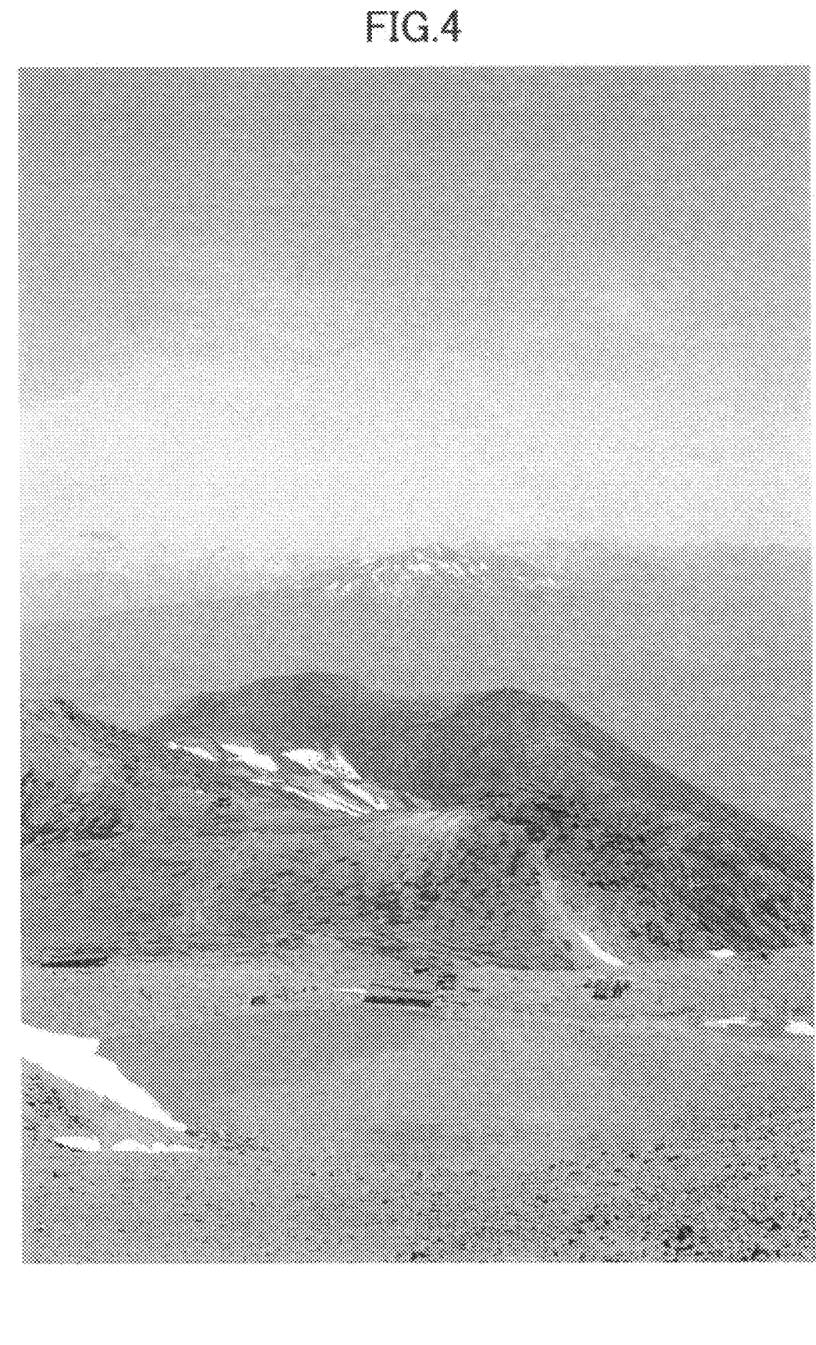
FIG. 4 shows an example of an original image prior to modification.

At the beginning of the image modification process, image data is inputted in S110. For example, image data indicative of a color image of the scene shown in FIG. 4 is inputted. In S120 the CPU 12 stores the image data in the RAM 16. Specifically, the CPU 12 displays a prescribed message on the display unit 24 in S110 prompting the user to specify a source of image data (a data storage area in a device connected to the image processor 1 via one of the various interfaces 30) and inputs image data via the one of the various interfaces 30 from the specified input source. The following processes are performed while processing the image data in the RAM 16.

In S130 the CPU 12 divides the image specified by the image data stored in the RAM 16 into: a close region and a distant region. Specifically, when the image data inputted in S110 includes distance data for specifying the distance from the camera or image pick-up device to one or more subjects in the image specified by the image data, the CPU 12 divides the image into the close region and the distant region based on distances specified in the distance data. If the image data does not include distance data, the CPU 12 displays a prescribed message on the display unit 24 prompting the user to specify a region of the image represented by the image data to be a distant region, and divides the image into the close region and the distant region based on the user's specification.

Figure 7A:
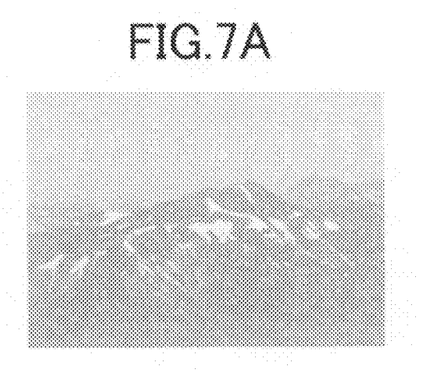
FIG. 7A shows a distant region of the original image of FIG. 4.

In the former case (i.e., when the image data includes distance data), the CPU 12 sets, based on the distance data, the close region to regions of the subjects that are positioned closer to the camera or image pick-up device than a prescribed distance, and sets the distant region to regions of other subjects that are positioned farther than the prescribed distance from the camera or image pick-up device. Here, the "prescribed distance" may be: a predetermined distance; a distance that is calculated based on the distribution of distances to all the subjects indicated in the distance data from the camera or image pick-up device; or a user-specified distance. When using a user-specified distance, the CPU 12 may display a prescribed message on the display unit 24 prompting the user to specify one of the distances to the subjects that are indicated in the distance data as a boundary between the close region and the distant region. Or, the CPU 12 may display another prescribed message on the display unit 24 prompting the user to specify his/her desired distance as a boundary between the close region and the distant region. FIG. 7A shows the distant region of the color image shown in FIG. 4.

In S140 the CPU 12 divides the image of the distant region into component images for the plurality of color components. In this process, the CPU 12 divides the distant region image into component images for the three primary colors of light, i.e. red (R), green (G), and blue (B).

Figure 3A:
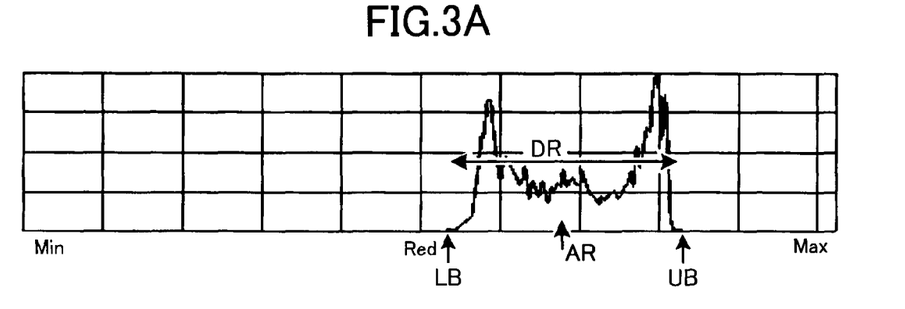
FIGS. 3A-3C are histograms for the respective component images prior to modification.
Figure 3B:
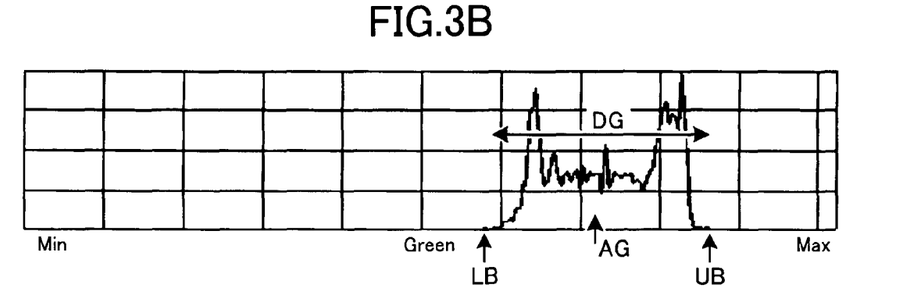
Figure 3C:
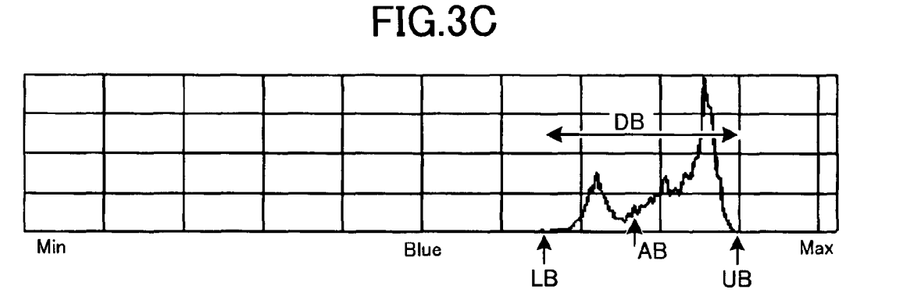
Figure 3D:
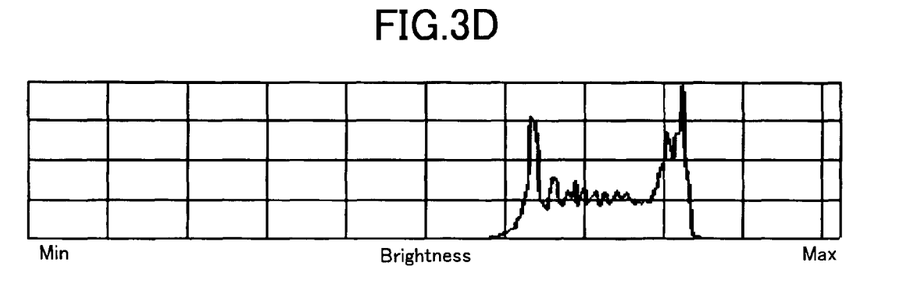
FIG. 3D is a histogram for all the component images prior to modification, that is, a total of the histograms of FIGS. 3A-3C.

In S150 the CPU 12 analyzes each component image, and determines the distribution of pixels at each level of brightness by creating a histogram for each component. FIGS. 3A-3C show the histograms for the red, green, and blue component images created for the distant region image of FIG. 7A. That is, FIG. 3A shows a histogram for the red component image, FIG. 3B shows a histogram for the green component image, and FIG. 3C shows a histogram for the blue component image. In each histogram, the horizontal axis represents the brightness of the corresponding color and the vertical axis represents the occurrence rate of pixels (number of pixels) for each level of brightness. The histograms shown in FIGS. 3A-3C indicate how pixels are distributed by brightness levels in the red, green, and blue component images, respectively. It is noted that FIG. 3D shows a histogram for all the red, green, and blue component images in total. The histogram of FIG. 3D is created by adding together the pixel numbers (counts) in the histograms of FIGS. 3A-3C at each level of brightness. In other words, FIG. 3D shows a histogram of the distant region image, where the horizontal axis represents the brightness and the vertical axis represents the occurrence rate of pixels (number of pixels) for each level of brightness. The histogram shown in FIG. 3D indicates the distribution of pixels in the distant region based on the level of brightness.

These histograms of FIGS. 3A-3D are the results of analyzing a color image of the scene shown in FIG. 7A. As can be seen from the histograms of FIGS. 3A-3D, the distribution band of the red component image (the width of pixel distribution along the horizontal axis in FIG. 3A; DR) is the widest, while the distribution band of the blue component image (DB in FIG. 3B) is the narrowest. The distribution bands for the respective color differ because the degree, by which light propagating through the atmosphere is scattered, differs according to the color component.

When imaging a distant scene with a camera or other image pick-up devices, light from the subjects travels through the atmosphere and arrives at the camera or other image pick-up devices, but each color component in the light is scattered to some extent by moisture, dust, and the like in the atmosphere. Consequently, each color component loses intensity by the time the light arrives at the camera or other image pick-up devices, losing some pixels in the original distribution and reducing the number of pixels in the original distribution and, as a result, narrowing the distribution band for the subject component image.

It can be understood that under the environment in which the scene of FIG. 4 is taken, the red component light is less likely to scatter than the other color components, while the blue component light is more likely to scatter than the other color components. So, the red component image has the widest distribution band, while the blue component image has the narrowest distribution band.

In S160 the CPU 12 corrects the histogram for each component image based on the analytical results from S150. Specifically, the CPU 12 corrects the distribution of pixels in each histogram so that the occurrence rate of pixels at the approximately minimum brightness levels and the approximately maximum brightness levels in the distribution band will become zero ("0"). This correction is for preventing highlight portions from becoming blank white, for preventing details from dropping out in the shadow and tuning into black, and for removing color unbalance.

The correction in S160 will be described below in greater detail.

It is now assumed that brightness is expressed in 256 levels from 0 to 255, where 0 (Min in FIGS. 3A-3D) is the darkest and 255 (Max in FIGS. 3A-3D) the brightest.

It is noted that as shown in FIGS. 3A-3D, in each histogram obtained in S150, pixels in the distant region are distributed within a region of the brightness levels from a lower bound LB to an upper bound UB. In other words, there appear no pixels that have their brightness levels lower than the lower bound LB or higher than the upper bound UB. The upper bound UB is smaller than or equal to the maximum value (255), while the lower bound LB is greater than or equal to the minimum value (0).

A darkest group of pixels, whose brightness levels are lower than the other remaining pixels and whose number is about 1% of the total number of pixels, and a brightest group of pixels, whose brightness levels are higher than the other remaining pixels and whose number is about 1% of the total number of pixels, are deleted from each histogram.

It is now assumed that the distant region has five million pixels in total. In this case, 1% of the total number of pixels is 50 thousand pixels.

It is further assumed that in the histogram for one component image, pixels are distributed within the region of the brightness levels from the lower bound LB of 5 to the upper bound UB of 250. There are no pixels whose brightness levels are lower than 5 or higher than 250. In this case, if the 50 thousandth darkest pixel has the brightness level of 135, then all pixel entries that have brightness levels of 0-135 are deleted from the histogram. Hence, the number of deleted pixels may exceed 50 thousands. Similarly, if the 50 thousandth brightest pixel has the brightness level of 205, all pixel entries that have brightness levels of 205-255 are deleted. As a result, the subject histogram is corrected to have the pixels distributed to have a minimum brightness of 136 and a maximum brightness of 204. Accordingly, the center of the distribution band becomes equal to the average value of the minimum 136 and maximum 204, or 170 (=(137+204)/2).

In the above description, pixels whose number is about 1% of the total number of pixels are deleted from each of the upper brightness-level region and the lower-brightness level region. However, pixels whose number is about 1% to 5% of the total number of pixels may be deleted from each of the upper brightness-level region and the lower-brightness level region.

In S170 the CPU 12 identifies a reference brightness in the distribution band for each component image. Specifically, the CPU 12 again generates, for each component image, a histogram that is the same as the histogram that has been calibrated in S160, and sets the brightness level in the center of the distribution band of each histogram (indicated by the arrows AR, AG, and AB in FIGS. 3A-3C) as the reference brightness for that component image. If a histogram for some color component image has been corrected in S160 to have the pixels distributed to have a minimum brightness of 136 and a maximum brightness of 204, as described above, the reference brightness is set equal to the center of the distribution band, that is, the average value 170 of the minimum 136 and maximum 204.

In S180, the CPU 12 determines, based on the histograms generated in S170, whether the degrees of distribution of pixels for brightness levels are appropriate for the respective component images. Specifically, the CPU 12 determines that the degrees of distribution of pixels for brightness levels are appropriate when the expression "DB≦DG≦DR" is satisfied, where DR is the distribution band width of the histogram for the red component image generated in S170, DG is the distribution band width of the histogram for the green component image generated in S170, and DB is the distribution band width of the histogram for the blue component image generated in S170. If the histogram for the green component image has been corrected in S160 to have the pixels distributed to have the minimum brightness of 136 and the maximum brightness of 204, the distribution band width DG of the histogram for the green component image is equal to 68 (=204−136).

If the CPU 12 determines that the calibrated histograms for the color component images have an appropriate combination of distributions of pixels for brightness levels (S180: YES), then in S190 the CPU 12 modifies the distribution of pixels for brightness levels in each of the non-reference component images, based on the distribution of pixels for brightness levels in a reference component image, by correcting the brightness value of each pixel in each of the non-reference component images.

It is noted that a component image of the color component to be least likely to scatter is determined in advance as the reference component image. In this example, the red component is less likely to scatter than the other color components, as described above, and hence the red component image is previously set as the reference component image, and the other component images (green and blue component images) are previously set as the non-reference component images. So, the CPU 12 modifies the distribution of pixels for brightness levels in the green and blue component images based on the distribution of pixels for brightness levels in the red component image.

More specifically, as shown in FIGS. 5A-5D, the CPU 12 adjusts the distribution of pixels for brightness levels in the non-reference component images (green and blue component images) by using a linear interpolation method so as to widen the distribution bands of histograms for the non-reference component images to widths approximately equal to the width of the distribution band of the histogram for the reference component image within a prescribed range based on the reference brightness positions AR, AG, and AB identified in S170 and based on the distribution band widths DR, DG, and DB determined in S180. In this example, the distributions of pixels for brightness levels in the non-reference component images (green and blue component images) are adjusted so that the distribution bands of the histograms for the non-reference component images generated in S170 will have widths exactly the same as the width of the distribution band of the histogram for the reference component image generated in S170.

In order to widen, using the linear interpolation method, the distribution band of histogram for the green component image to the width equal to the width of the distribution band of the histogram for the red component image based on the reference brightness positions AR and AG and based on the distribution band widths DR and DG, the brightness value G of each of all the pixels is corrected into a corrected brightness value G' by satisfying the following formula:

$$(G'-AG)/(G-AG)=DR/DG$$

This correction ensures that the histogram for the green component image generated in S170 is widened to have the width equal to the width DR of the histogram for the red component image generated in S170, with the reference brightness point AG being fixed unchanged.

Similarly, in order to widen, using the linear interpolation method, the distribution band of histogram for the blue component image to the width equal to the width of the distribution band of the histogram for the red component image based on the reference brightness positions AR and AB and based on the distribution band widths DR and DB, the brightness value B of each of all the pixels is corrected into a corrected brightness value B' by satisfying the following formula:

$$(B'-AB)/(B-AB)=DR/DB$$

This correction ensures that the histogram for the blue component image generated in S170 is widened to have the width equal to the width DR of the histogram for the red component image generated in S170, with the reference brightness point AB being fixed unchanged.

Figure 5A:
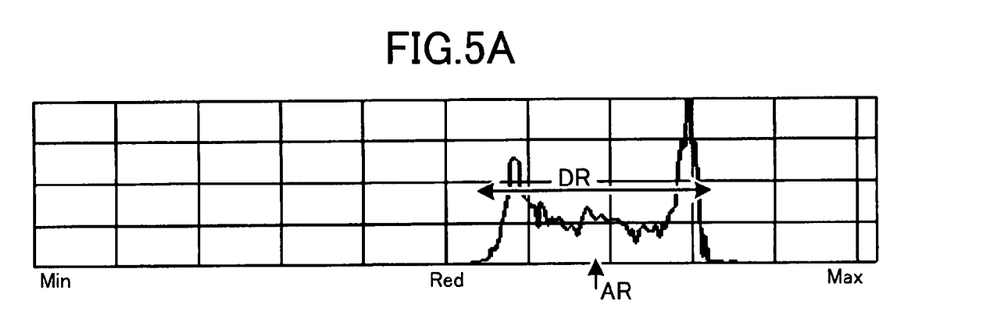
FIGS. 5A-5C are histograms for the respective component images after modification.
Figure 5B:
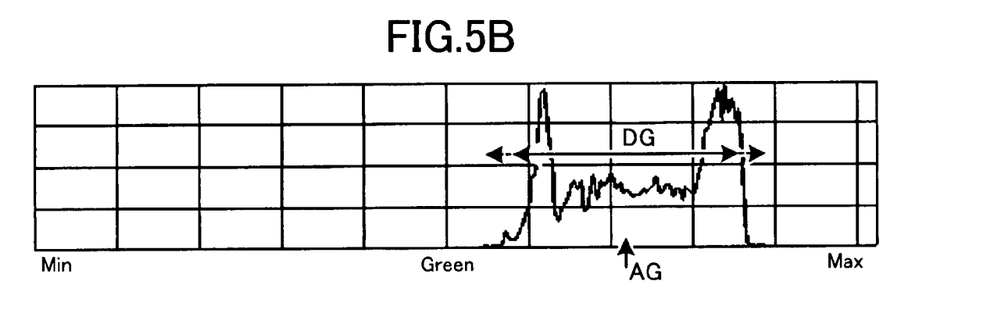
Figure 5C:
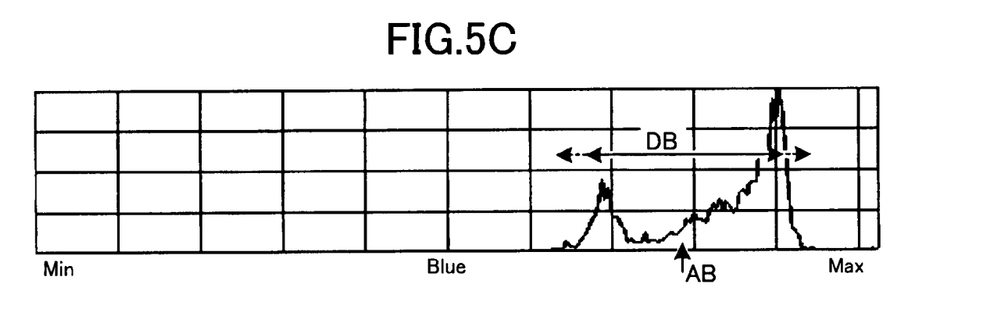
Figure 5D:
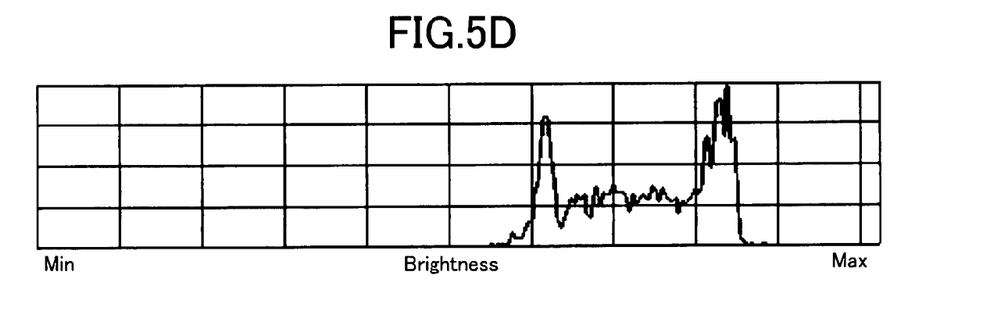
FIG. 5D is a histogram for all the component images after modification, that is, a total of the histograms of FIGS. 5A-5C.

It is noted that FIG. 5D shows a histogram for all the red, green, and blue component images of FIGS. 5A-5C. The histogram of FIG. 5D is created by adding together the pixel numbers (counts) in the histograms of FIGS. 5A-5C at each level of brightness. The histogram shown in FIG. 5D indicates the distribution of pixels in the distant region based on the level of brightness that is obtained after the histograms for the green and blue color component images are corrected.

By thus widening the distribution band of component images for color components that tend to scatter easily in this way, the color components that scatter more easily can be enhanced to approximately the same degree as the color components that scatter less easily.

In this way, in S160, the histograms of the color component images are corrected to determine the centers AR, AG, and AB, and the widths DR, DG, and DB by deleting entries of the brightest group of pixels and the darkest group of pixels from the histograms generated in S150. In other words, in S160, no pixels are actually deleted from the image data. Then, green and blue brightness values for all the pixels in the image data are corrected in S190.

In S200 the component images, among which green and blue component images have been modified in S190, are combined together to form the distant region, and in S210 the CPU 12 adjusts the white balance for the distant region. Specifically, the CPU 12 calculates a correction value for the color tone based on the color components in the image of the distant region and adjusts the white balance by correcting the color components with the calculated correction value. As a specific method of adjusting the white balance, the method disclosed in U.S. Pat. No. 7,030,913, column 1, line 34-column 2, line 26, may be used, for example, the disclosure of which is herein incorporated by reference.

Next, the white balance adjustment for the distant region will be described in detail.

(1) First, in order to detect white, the RGB values for each pixel in the distant region are converted to a brightness value Y according to the following equation:

$$Y=0.299R+0.587G+0.114B$$

It is noted that when the values of RGB are equal to each other at any value between 0 and 255, Y is calculated to a corresponding value. Hence, it is known that the pixel is black when Y=0 and it is known that the pixel is white when Y=255.

(2) Next, a histogram is created using values of the brightness Y for all the pixels in the distant region.

(3) Next, the CPU 12 examines the generated histogram, and extracts, from all the pixels in the distant region, those pixels whose number is about 1 to 5% of the total number of the pixels in the distant region and whose brightness values Y are greater than the other remaining pixels.

(4) Next, the CPU 12 finds an average value for the red component values of the extracted pixels, an average value for the green component values of the extracted pixels, and an average value for the blue component values of the extracted pixels.

(5) Next, the CPU 12 determines a set of values (Y, Cr, Cb) indicative of an average white W for the extracted pixels, by calculating the following formulas based on the average values R, G, B of the red, green, and blue components of the extracted pixels:

$$Y=0.299R+0.587G+0.114B,$$

$$Cb=-0.169R-0.331G+0.500B, \text{ and}$$

$$Cr=0.500R-0.419G-0.081B.$$

(6) Next, the CPU 12 adjusts the RGB component values in the extracted pixels in order that the pair of color difference values Cr and Cb of the average white W in the extracted pixels will become equal to zero (0) and that the average white W of the extracted pixels will be indicated by a set of values (Y, 0, 0).

In S220 the CPU 12 combines the close region, which has been separated in S130, with the distant region, which has been recombined in S200 and adjusted in white balance in S210, to form the completed image, and subsequently ends the image modification process. In S220 the CPU 12 stores image data indicating the complete image on the HDD 18.

Figure 6:
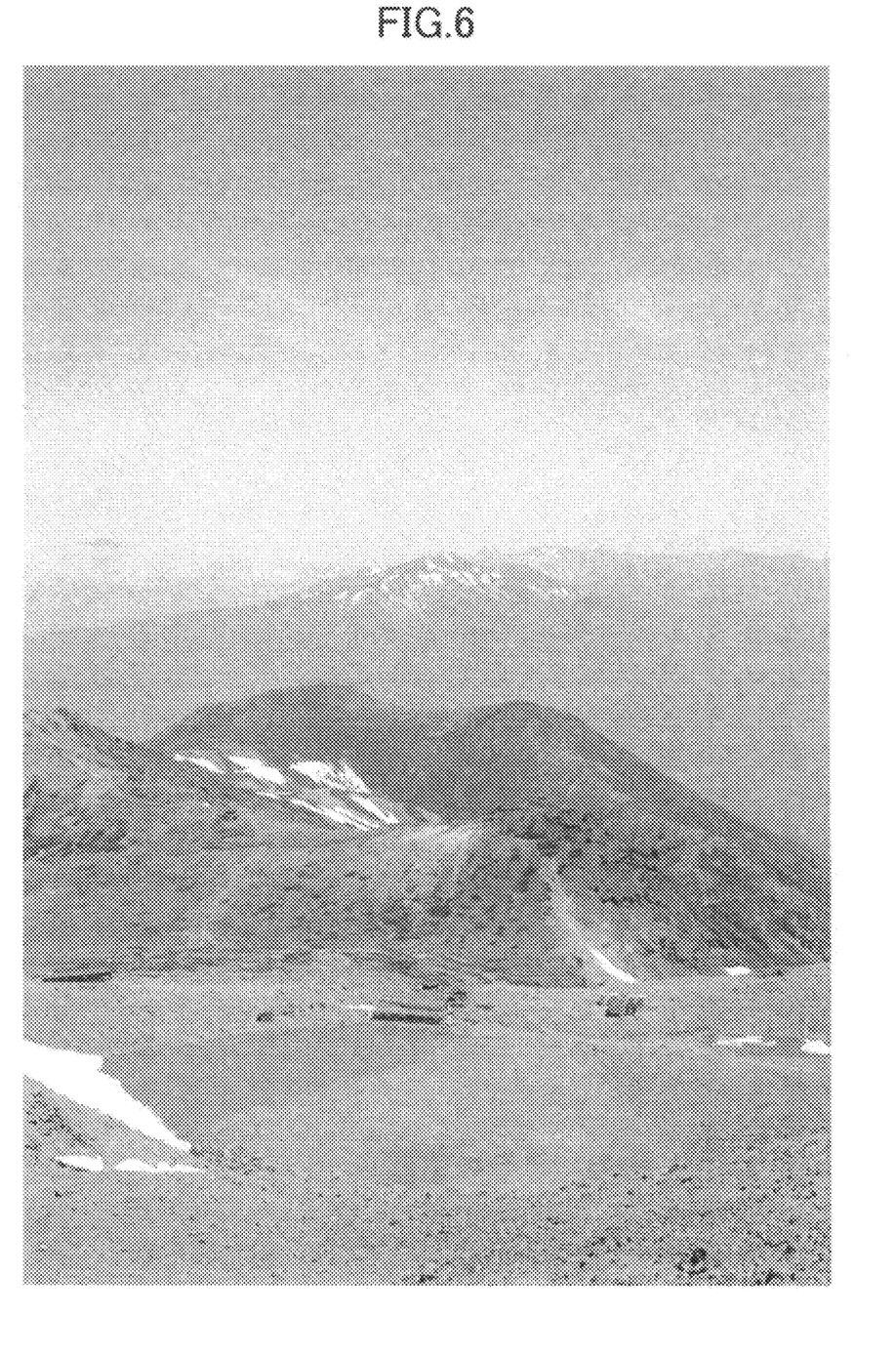
FIG. 6 shows an image obtained through the modification of the original image of FIG. 4.
Figure 7B:
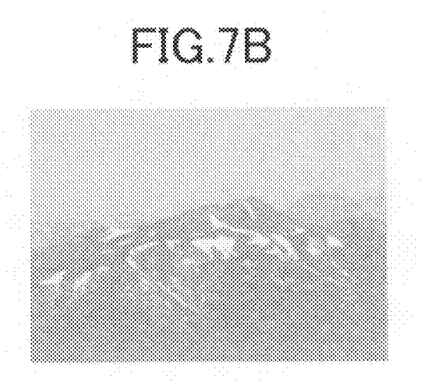
FIG. 7B shows a distant region of the modified image of FIG. 6.

FIG. 6 shows the complete image obtained in S220, and FIG. 7B shows the part of the distant region in the image of FIG. 6. Thus, FIGS. 7A and 7B show the part of the distant region in the same image before and after the image modification process of FIG. 2. From FIGS. 7A and 7B, it is clear that the image resulting from the image modification process of FIG. 2 has a higher contrast in the distant region than the original image.

On the other hand, when the CPU 12 determines in S180 that the respective component images have an inappropriate combination in the distributions of pixels for brightness levels (no in S180), then in S230 the CPU 12 displays a message on the display unit 24 indicating this problem, and subsequently ends the image modification process of FIG. 2.

Figure 2:
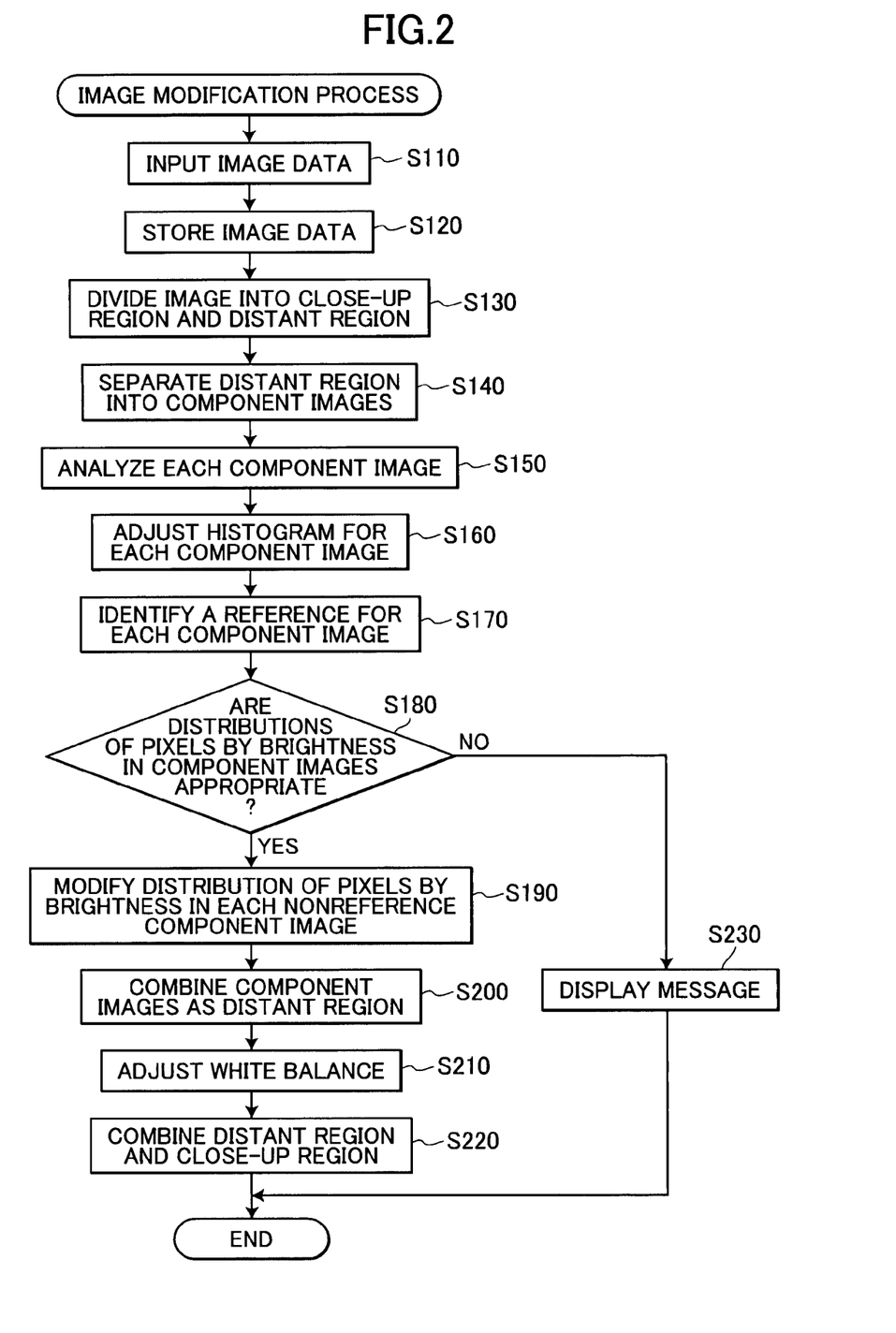
FIG. 2 is a flowchart illustrating steps in an image modification process executed by the image processor of FIG. 1.

The image processor 1 having the construction described above separates an image of the distant region from an image of a photographed scene into component images for the plurality of color components (S140 in FIG. 2), and uses the component image of a color component least likely to scatter in the atmosphere as reference for adjusting the distribution of pixels by brightness in the other component images (S190 in FIG. 2).

By adjusting color components tending to scatter easily in the atmosphere based on the color component that is less likely to scatter, it is not only possible to increase the contrast of the image, but also to enhance reproducibility of each color component in the image by adjusting each color component separately, rather than simply adjusting the brightness of the image. Hence, it is possible to ultimately obtain an image that is visually appealing.

In the embodiment, the distribution bands in the non-reference component images are adjusted to widths that are approximately equal to the width of the distribution band in the reference component image within the prescribed range (S190 in FIG. 2). When looking at the distribution of pixels by brightness, a narrow distribution band indicates that the color component has been scattered when the light has passed through the air.

Hence, by setting the distribution bands in the non-reference component images to a width approximately equal to the width of the distribution band in the reference component image within the prescribed range, it is possible to amplify the color components to the same degree as the color component in the reference component image.

In the embodiment described above, the distributions of pixels for each brightness level in each non-reference component image are adjusted so that the distribution band in the non-reference component image is widened about the center of the band (S190 in FIG. 2). Hence, it is possible to prevent the non-reference component image from having such a distribution band in which only one of either the relatively bright pixels or relatively dark pixels is widely distributed. As a result, it is possible to adjust the image into such an image that is less likely to have an unnatural brightness or contrast.

Following are conceivable methods for adjusting the distribution band in each non-reference component image to a band that is approximately equal to the distribution band in the reference component image:

(1) The band width is widened by increasing the number of relatively bright pixels or relatively dark pixels.

(2) The distribution of pixels by brightness in the non-reference component image is changed into such a distribution that is approximately equal to the distribution of pixels by brightness in the reference component image.

However, in the conceivable method (1), there is a danger that the color component in the non-reference component image may become unnaturally bright or dark. In the conceivable method (2), the greater the difference in brightness among color components in the non-reference component image and the reference component image, the greater the danger that the color component in the non-reference component image will have unnatural brightness due to this difference.

Therefore, according to the embodiment, when adjusting the distribution of pixels by brightness in the non-reference component image, the width of the distribution band in the non-reference component image is widened with reference to the prescribed position in the distribution band. In the above-described embodiment, the reference position is the center position in the distribution band. However, the reference position may differ from the center position in the distribution band.

In the embodiment, after combining the component images together into the image of the distant region, the white balance of the image in the distant region is adjusted (S210 in FIG. 2). Accordingly, the image of the distant region can be adjusted for appropriately rendering white in the image combined as the distant region.

In the embodiment described above, the reproducibility of each color component in the entire image can be sufficiently enhanced by adjusting the distribution of pixels for each brightness level in the distant region and by not adjusting the distribution of pixels for each brightness level in the close region that has less light scattering than the distant region.

The contrast in an image of a distant scene taken by a camera or other image pick-up devices is reduced due to the scattering of light propagating through the atmosphere. However, this scattering is more remarkable for distant shots having a greater distance to the subject, as described above.

Therefore, when an image taken of a scene includes not only a distant region with a greater amount of light scattering, but also a close region having a smaller amount of light scattering, there is a danger that the reproducibility of color components in the image cannot be sufficiently enhanced if the distribution of pixels for each brightness level in the non-reference component images were adjusted for the entire image.

Hence, according to the present embodiment, when an image taken of a scene includes not only a distant region but also a close region, only the distant region of the image is adjusted to enhance reproducibility of each color component in the image.

Further, when the image data includes distance data identifying distances to one or more subjects, the image specified by the image data can be divided into a distant region and a close region based on the distances identified by the distance data (S130 in FIG. 2).

When dividing an image into a close region and a distant region based on such distance data, it is also possible to prompt the user to specify a desired distance among the distances specified in the distance data as a boundary between the close region and the distant region. In this case, the image specified by the image data is divided into a close region and a distant region based on the user-specified distance.

In the embodiment, the green and blue component images are adjusted under the assumption that the distribution band of the histogram corresponding to the red component image is wider than the distribution band in the green component image, and the distribution band in the green component image is wider than the distribution band in the blue component image based on the degree of scattering in light propagating through the atmosphere.

When the primary subject of the image is a rape-blossoms field or the like with the color yellow dominating both the close region and the distant region, then the above assumption is not met because a color component other than red is an extremely strong component in the image represented by the image data. In such a case, the distributions of brightness among pixels in the component images are considered inappropriate. There is a danger that the reproducibility of each color component in the image will not be sufficiently enhanced if the component images were adjusted.

In order to prevent this problem, the image processor 1 according to the embodiment determines whether the distributions of brightness levels among pixels in the component images are appropriate based on the distribution band widths of the component images (S180 in FIG. 2) and adjusts the non-reference component images only when the distributions are determined to be appropriate. Hence, the image processor 1 can avoid modifying the non-reference component images when it is thought that the reproducibility of color components in the image cannot be sufficiently enhanced.

While the invention has been described in detail with reference to the embodiment thereof, it would be apparent to those skilled in the art that various changes and modifications may be made therein without departing from the spirit of the invention.

The image processor of the above-described embodiment is implemented with a personal computer. However, the image processor may be implemented with a device other than a personal computer, such as a printer or MFP (Multi Functional photocopier), provided that the device includes a hardware structure capable of executing the image modification process described above. When the image processor is incorporated in the printer or MFP, the printer or MFP may be configured to directly output the image after modification.

When adjusting the distribution of brightness in non-reference component images in S190, the image processor 1 adjusts the distribution bands in the non-reference component images to the same width as the distribution band in the reference component image. However, the image processor may be configured to adjust these distribution bands wider or narrower than the distribution band in the reference component image, provided that reproducibility of the color components in the image can be sufficiently enhanced. For example, if the distribution band in the reference component image has a width of 100, for example, the distribution band in the non-reference component image may be adjusted to a width in a range of 90 to 110. In this case, the distribution band of the non-reference component image is widened to the width approximately equal to the width of the distribution band of the histogram for the reference component image within the prescribed range of ±10.

Further, the image processor 1 may be modified to widen the distribution band in the reference component image and to adjust the distribution bands in the non-reference component images to the same width as the widened distribution band in the reference component image. This configuration can further improve the reproducibility of the color components and further enhance the contrast, thereby making the image seem more beautiful to the viewer.

In the embodiment, the image processor 1 is configured to modify the distribution of pixels for the brightness levels in each non-reference component image so that the distribution band in the non-reference component image will be widened about its center brightness level (S190 in FIG. 2). However, when modifying the distribution of pixels for the brightness levels in the non-reference component image, the image processor 1 may be modified to widen the distribution band about a brightness level other than the center brightness level, provided that the resulting image is not likely to have an unnatural brightness (or contrast).

There is no particular restriction on the method of image modification, provided the method modifies the distribution of pixels by brightness in the non-reference component image based on the distribution of pixels by brightness in the reference component image.

What is claimed is:

1. An image processing device comprising:
    a component separating unit that separates an image, which is represented by image data obtained by imaging a scene, into component images for a plurality of color components;
    a distribution modifying unit that sets one of the component images for a predetermined color component as a reference component image, that sets at least one component image other than the reference component image as at least one non-reference component image, and that modifies distribution of pixels for brightness levels in each non-reference component image based on distribution of pixels for brightness levels in the reference component image; and
    a component combining unit that combines together the reference component image and the at least one non-reference component image modified by the distribution modifying unit.

2. An image processing device according to claim 1, wherein among the plurality of color components, the predetermined color component is least likely to scatter when light propagates through an atmosphere.

3. An image processing device according to claim 2, wherein the distribution modifying unit modifies the distribution of pixels for brightness levels in the non-reference component images so that a distribution band of pixels distributed by brightness in each non-reference component image has a band width that is approximately equal to a distribution band of pixels distributed by brightness in the reference component image within a prescribed range.

4. An image processing device according to claim 3, wherein the distribution modifying unit modifies the distribution of pixels for brightness in each non-reference component image so that the band width of the distribution band in the each non-reference component image is widened based on a center of the distribution band.

5. An image processing device according to claim 4, wherein the distribution modifying unit modifies the brightness level of each pixel in each non-reference component image by the following formula, $$(P'-C)/(P-C)=D1/D2,$$

wherein P is an original brightness level of the each pixel, P' is a modified brightness level of the each pixel, C is the center of the corresponding distribution band, D1 is the band width of the distribution band in the reference component image, and D2 is the band width of the distribution band in the each non-reference component image.

6. An image processing device according to claim 1, further comprising a white balance adjusting unit that adjusts a white balance of the image combined by the component combining unit.

7. An image processing device according to claim 1, further comprising:
    a region dividing unit that divides, based on the image data representing the image taken of a scene by an image pick-up device, the image represented by the image data into a close region in which a subject is positioned closer to the image pick-up device than a prescribed distance, and a distant region in which another subject is positioned farther away from the image pick-up device than the prescribed distance,
    wherein the component separating unit separates the image only for the distant region into the component images, the distribution modifying unit modifies the distributions only for the distant region, and the component combining unit combines the component images only for the distant region,
    further comprising: a region combining unit that combines the close region and the component images for the distant region combined by the component combining unit.

8. An image processing device according to claim 7, wherein the image data includes distance data identifying a distance from the image pick-up device to at least one subject,
    the region dividing unit divides the image represented by the image data into the close region and the distant region based on the distance identified by the distance data.

9. An image processing device according to claim 8, further comprising a distance specifying unit that prompts a user to specify a boundary distance that indicates a boundary between the close region and the distant region;
    wherein the region dividing unit divides the image based on the boundary distance specified by the distance specifying unit, by setting a region, in which a subject is positioned closer than the specified boundary distance to the image pick-up device, as the close region, and by setting another region, in which the subject is positioned farther away from the image pick-up device than the specified boundary distance, as the distant region.

10. An image processing method, comprising:
inputting into a processor an image obtained by imaging a scene;
separating the image, which is represented by image data obtained by imaging a scene, into component images for a plurality of color components;
setting one of the component images for a predetermined color component as a reference component image, setting at least one component image other than the reference component image as at least one non-reference component image, and modifying distribution of pixels for brightness levels in each non-reference component image based on distribution of pixels for brightness levels in the reference component image; and
combining together the reference component image and the modified at least one non-reference component image.

11. A computer readable storage device storing a set of image processing program instructions executable on a data processing device, the set of image processing program instructions comprising:
separating an image, which is represented by image data obtained by imaging a scene, into component images for a plurality of color components;
setting one of the component images for a predetermined color component as a reference component image, setting at least one component image other than the reference component image, and modifying distribution of pixels for brightness levels in each non-reference component image based on distribution of pixels for brightness levels in the reference component image; and
combining together the reference component image and the modified at least one non-reference component image.

* * * * *